United States Patent [19]

Bate et al.

[11] Patent Number: 4,614,554
[45] Date of Patent: Sep. 30, 1986

[54] METHOD OF MAKING A GASKET

[75] Inventors: Cecil A. Bate, Ickenham; Kay Robinson, West Drayton, both of England

[73] Assignee: Payen International Limited, England

[21] Appl. No.: 650,083

[22] Filed: Sep. 13, 1984

[30] Foreign Application Priority Data

Sep. 16, 1983 [GB] United Kingdom ............... 8324887

[51] Int. Cl.⁴ .................. B32B 31/12; B32B 15/16
[52] U.S. Cl. .................................. 156/62.2; 156/283;
156/312; 427/189; 427/191; 264/109; 428/408;
277/235 B
[58] Field of Search ................... 156/62.2, 62.8, 312,
156/283, 295, 297, 302; 264/109, 112, 113, 123,
DIG. 67; 277/235 B, 235 A; 427/189, 190, 191,
194, 360, 365; 428/408; 118/106, 109

[56] References Cited

U.S. PATENT DOCUMENTS 3,404,061 10/1968 Shane et al. ................... 264/109 X
4,234,638 11/1980 Yamazoe et al. ............... 277/235 B
4,283,246 8/1981 Held ..................................... 156/555
4,333,975 6/1982 Booth ............................. 428/408 X
4,350,545 9/1982 Garabedian ..................... 156/286 X
4,422,894 12/1983 Atkinson et al. ................. 156/62.2
4,435,235 3/1984 Atkinson et al. ............. 156/62.8 X

FOREIGN PATENT DOCUMENTS 2923036 12/1980 Fed. Rep. of Germany .
2088491 6/1982 United Kingdom .
2088490 6/1982 United Kingdom .

Primary Examiner—Edward Kimlin
Assistant Examiner—Ramon R. Hoch
Attorney, Agent, or Firm—Nixon & Vanderhye

[57] ABSTRACT

A gasket made of compressed expanded graphite particles bonded to an apertured reinforcement plate whose apertures are bridged by a relatively narrow area, as in a cylinder head gasket, is made by pressing the graphite particles onto the face of the plate without transverse support of those particles at the periphery of the plate apertures, by pressing between two compressor belts.

5 Claims, 1 Drawing Figure

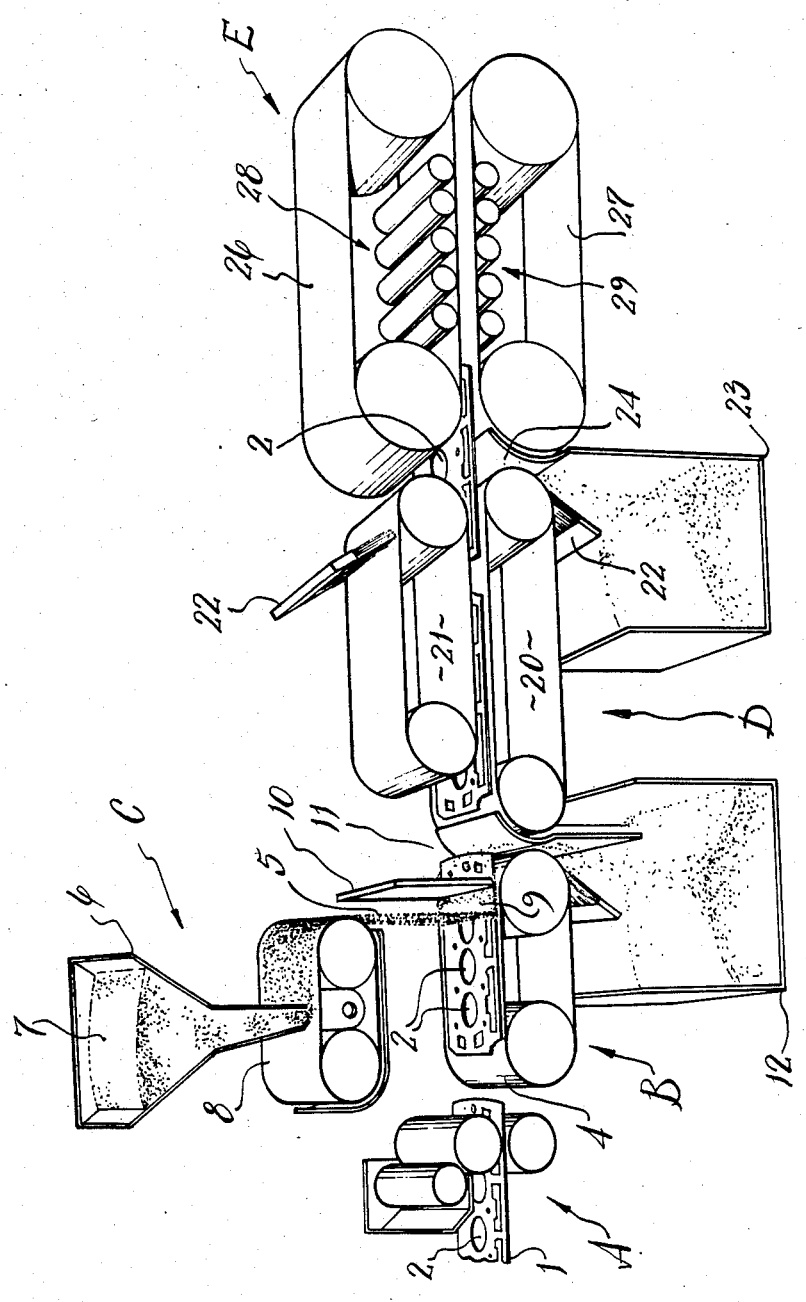

METHOD OF MAKING A GASKET

This invention relates to a method of making a gasket, more particularly a gasket of the kind comprising a graphite foil and a reinforcement plate therefor.

In UK Patent Application 2 088 491A there is described a method of making such a gasket for automotive and petrochemical applications which entails (among other things) pressing particles of expanded graphite in a mould onto the face of an apertured reinforcement plate to compact the particles and unite them into a foil which adheres to the plate. The method described in the citation avoids the excessive waste of graphite that results when cutting foils from sheets of compressed expanded graphite, but does not give good results when applied to the manufacture of gaskets which have a relatively narrow area bridging adjacent apertures, as in a gasket for the cylinder head of an internal combustion engine. What happens is that the bridging portion becomes formed with too low a density to have adequate strength or sealing capacity.

It has occurred to us that this disadvantage might be overcome by avoiding the use of a mould, ie by pressing under conditions such that the graphite particles at the periphery of the plate are laterally unsupported; for without the presence of mould sidewalls and other vertical mould elements it ought to be much easier to distribute the expanded graphite for compression uniformly over the reinforcement plate. We have now found that this is indeed so, and have also found that, owing to the very large angle of repose of particles of expanded graphite, pressing without lateral support at the periphery nevertheless yields a graphited product whose periphery is acceptably uniform with the remainder.

Accordingly, in the method of the invention for making a gasket by pressing particles of expanded graphite onto the face of an apertured reinforcement plate to compact the particles and unite them with the plate, pressing is carried out with the graphite particles at the periphery of the plate laterally unsupported. Pressing is preferably performed by passing the apertured reinforcement plate carrying particles of expanded graphite between two compressor belts.

The expanded graphite particles employed suitably have a density in the range 4–40 kg/m$^3$. The graphite foil forming part of the finished gasket will usually have a density in the range 800–1600 kg/m$^3$. The 'finished density' need not be achieved by a single pass between compressor belts, and it may be convenient to press in two or more stages, in the first of which the graphite particles are compacted to a density of at least 400 kg/m$^3$ between two relatively soft compressor belts, and in the subsequent stage or stages the graphite particles are further compacted to a density in the range 800–1600 kg/m$^3$ between two hard compressor belts.

Whatever the procedure adopted, it is desirable in the initial stages of pressing between compressor belts to have one of the belts provided with means through which, via the reinforcement plate apertures, air displaced from the expanded graphite particles during compaction can escape. Otherwise, during the initial stages of compaction, the air may escape directly through the graphite itself, and blow holes in it. Means of escape for air may be provided in the belt in the form of channels.

In coating the apertured reinforcement plate with particles of expanded graphite for delivery to the compressor belts and compaction of the graphite particles, it will—if the plate is a smooth-surfaced one—usually be advisable first to coat the plate surface with adhesive before depositing the graphite particles on it. The graphite particles are conveniently deposited onto the plate from feed means mounted above a conveyor on which the plate moves on its way to the compressor belts. Transfer of the plate from the conveyor to the compressor belts suitably takes place across a gap through which those particles fall which are not supported by the plate. Such particles (eg those within the 'cylinder bore apertures' of a cylinder head gasket plate) are of course collected for re-use.

The invention will now be further described with reference to the accompanying drawing, which is a schematic drawing of plant for making a gasket for the cylinder head of a 4-cylinder internal combustion engine.

The plant includes a unit A for roller-coating with adhesive the upper surface of a smooth-surfaced reinforcement plate 1 having various apertures, of which only the largest (for engine cylinder bores) are shown numbered (2). From unit A the 'empty' coated plate 1 passes to unit B, on whose conveyor 4 it receives a deposit of expanded graphite particles falling under gravity as a curtain 5 from feed unit C, whose hopper 6 is kept supplied with expanded graphite 7 which is then delivered to conveyor 8. The reinforcement plate thus becomes completely covered, as at 9, with a deposit of expanded graphite particles, and the deposit is made level by means of a doctor blade 10. The graphite-coated plate is then delivered from unit B to a first compressor unit D, across a gap 11 through which surplus graphite falls into a collecting bin 12. Such surplus graphite comes predominantly from those areas on conveyor 4 of unit B which are outside the perimeter of plate 1 and those which register with cylinder apertures 2, but other surplus comes from areas registering with the push rod apertures, and oil-, water- and bolt-apertures of plate 1.

Unit D comprises two compressor belts 20 and 21 of relatively soft material such as nylon/synthetic rubber composition which is 2–3 mm thick. The lower belt 20 is made with V-section channels (not shown) 1 mm deep and 1 mm wide at the top, which extend longitudinally of the belt, and are spaced every 2 mm across the belt, these channels providing for air escape as previously described.

The inclination of upper belt 21 to lower belt 20, and its distance of closest approach thereto, are adjustable to give a desired degree of compaction (to a density of at least 400 kg/m$^3$) to the deposit of expanded graphite on the reinforcement plate 1 fed between the belts from unit B. Situated above belt 21 and below belt 20 are stiff brushes 22 which remove from the belts graphite which adheres to them as a result of the compaction operation. Such surplus graphite duly falls into bin 23 through gap 24 as the plate with its coating of partly compacted graphite particles moves from unit D to the succeeding compressor unit E. Unit E comprises two compressor belts 26 and 27 of stainless steel, and two series of small rollers 28 and 29 which urge the belts 26 and 27 towards one another so as to compact further the partly compacted graphite on the reinforcement plate passing between them to a desired finished density, say of 1500 kg/m$^3$.

The composite of reinforcement plate and graphite foil issuing from unit E is then inverted and fed again to the units A–E, to form a graphite foil on the other side of the plate. (This second foil need not be made to have the same density or thickness as the first, and the resulting gasket will then have one side more conformable than the other to the less even of a pair of surfaces between which the gasket is clamped.) Graphite particles are then trimmed from the cut interior edges of the gasket, such as the cylinder bore apertures.

After formation as just described, the gasket can be subjected to such conventional operations as the insertion of eyelets and treatment of the gasket surface to promote easy release—as during engine servicing—from a cylinder head block.

I claim:

1. A method of making a cylinder head gasket for an internal combustion engine comprising pressing particles of expanded graphite onto the face of an apertured reinforcement plate whose apertures correspond to the engine cylinder bores, adjacent apertures being bridged by a relatively narrow area, to compact the particles and unite them with the plate, by passing the apertured reinforcement plate carrying particles of expanded graphite on its face but not within its apertures and without lateral support for the graphite particles between two compressor belts, one of the belts being provided with means through which, via the reinforcement plate apertures, air displaced from the expanded graphite particles during compaction can escape.

2. A method according to claim 1, in which said means takes the form of channels in the belt.

3. A method according to claim 1, in which the apertured reinforcement plate carrying particles of expanded graphite is delivered to the compressor belts from a conveyor above which there are means for feeding particles of expanded graphite onto an empty plate conveyed by the conveyor.

4. A method according to claim 1, in which transfer of the apertured reinforcement plate carrying particles of expanded graphite from the conveyor to the compressor belts takes place across a gap through which those graphite particles fall which are carried by the cnveyor but not by the reinforcement plate.

5. A method according to claim 1, in which pressing of the particles of expanded graphite onto the face of the apertured reinforcement plate is carried out in two or more stages, in the first of which the graphite particles are compacted to a density of at least 400 kg/m$^3$ between two relatively soft compressor belts, and in the subsequent stage or stages the graphite particles are compacted to a density in the range 800–1600 kg/m$^3$ between two hard compressor belts.

* * * * *